Nov. 4, 1958  G. W. CALVERT  2,858,940
DEVICE FOR REMOVING CREAM FROM MILK IN BOTTLES
Filed Oct. 3, 1957
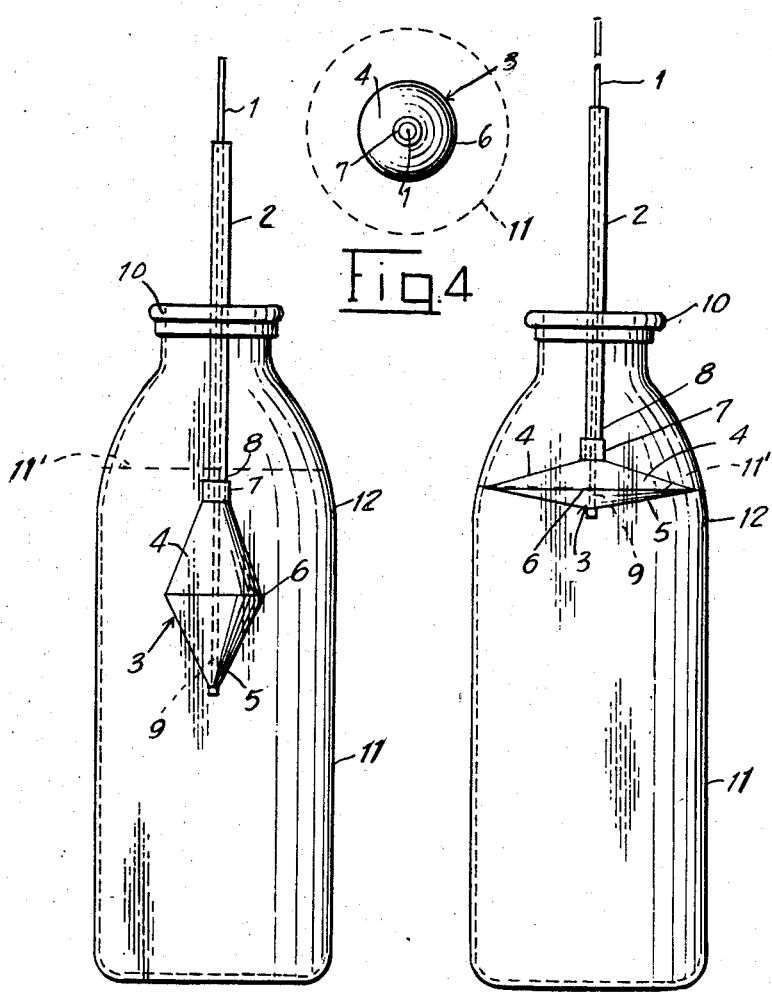
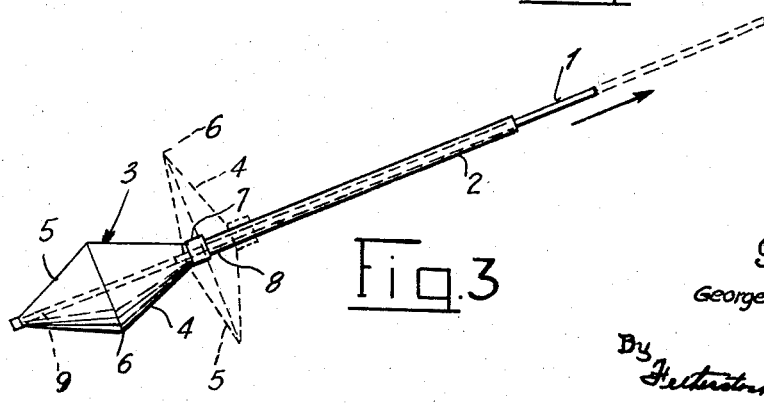
Inventor
George W. Calvert

United States Patent Office 2,858,940
Patented Nov. 4, 1958

2,858,940

DEVICE FOR REMOVING CREAM FROM MILK IN BOTTLES

George W. Calvert, Ponoka, Alberta, Canada

Application October 3, 1957, Serial No. 688,033

2 Claims. (Cl. 210—516)

My invention relates to new and useful improvements in devices for removing cream from milk in bottles, the principal object and essence of my invention being to provide a device which is insertable within the milk bottle, capable of being lowered through the cream with the minimum disturbance thereto, and then is capable of being expanded to contact the sides of the bottle so that the cream can be removed therefrom.

Many devices have been developed for removing the cream which collects upon the top of the milk in a bottle after same has been left standing, such devices consisting of scoops or other barrier-type devices which are inserted within the tops of the milk bottles, lowered carefully through the cream, and then removed with the cream contained therein. These devices all suffer from a common disadvantage that considerable disturbance of the cream takes place as they are inserted thus causing a certain amount of mixing at the boundary between the cream and the milk and preventing complete removal of the cream.

I have overcome these disadvantages by providing a device which can be inserted through the cream with the minimum disturbance thereof and which can then be expanded to contact the sides of the bottle at the cream line completely sealing off the milk below and enabling the cream to be poured from the bottle without intermixing taking place.

A further object of my invention is to provide a device of the character herewithin described which is usable in milk bottles of different capacities.

Yet another object of my invention is to provide a device of the character herewithin described which is extremely easy to manipulate, simple in construction and otherwise well suited to the purpose for which it is designed.

With the foregoing objects in view, and such other objects and advantages as will become apparent to those skilled in the art to which this invention relates as this specification proceeds, my invention consists essentially in the arrangement and construction of parts all as hereinafter more particularly described, reference being had to the accompanying drawings in which:

Figure 1 is a side elevation of my device shown inserted in a milk bottle and in the contracted or insertable position.

Figure 2 is a view similar to Figure 1, but with the device expanded to seal off the milk from the cream.

Figure 3 is a perspective elevation of my device per se.

Figure 4 is a top plan view of my device in the contracted position with the milk bottle shown in phantom.

In the drawings like characters of reference indicate corresponding parts in the different figures.

Proceeding now to describe my invention in detail, it will be seen upon reference to the accompanying drawings that it consists of an elongated handle 1 comprising a rod together with a sleeve 2 surrounding said handle and slidable therealong.

A diaphragm collectively designated 3 consists of a pair of substantially circular membranes 4 and 5 secured together by a conventional adhesive around the perimeters 6 thereof. These membranes are preferably of a flexible material, but having sufficient inherent rigidity to maintain the position in which they are placed as will hereinafter be described.

The upper membrane 4 is provided with a cell 7 secured by adhesive to the centre of the membrane 4 and this cell is in turn secured to the lower end 8 of the aforementioned sleeve 2 and it should be noted that the handle or rod 1 can pass through this cell and through the upper membrane 4.

The lower end 9 of the handle 1 is in turn secured centrally to the membrane 5 thus permitting contraction and expansion of the diaphragm by sliding the sleeve and rod relative to one another.

The inherent rigidity of the flexible membranes 4 and 5 cause the diaphragm to take up the position shown in Figure 1 when the device is contracted by moving the sleeve 2 upwardly relative to the rod 1 and Figure 2 shows the position of the diaphragm in the expanded position caused by moving the sleeve downwardly with respect to the rod 1.

In operation, the device is placed in its retracted position shown in Figure 1 whereupon it is inserted through the neck 10 of the associated milk bottle 11, its relatively small effective diameter and streamlined configuration enabling it to pass through the cream with the minimum disturbance thereto. In this connection, the cream and milk junction line is indicated by the reference character 11'.

The device is inserted well below the cream line 11' whereupon the diaphragm is expanded to the position shown in Figure 2 and at the same time raised so that the perimeters 6 of the membrane contact the sides 12 of the bottle at the cream line. Pressure is then exerted between the rod and the tube thus sealing off the milk and enabling the cream to be poured from the bottle into a suitable container without becoming diluted with milk.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

What I claim as my invention is:

1. A device for removing cream from milk in bottles, comprising in combination an elongated handle, a flexible diaphragm on one end of said handle adapted to be inserted into the associated bottle, and means on said handle co-operating with said diaphragm to expand and contract same radially whereby the perimeters thereof, when expanded, contact the sides of the bottle and follow the contour thereof as the device is drawn upwardly therefrom said diaphragm consisting of upper and lower membranes secured to each other around the perimeters thereof.

2. The device according to claim 1 in which said means includes a sleeve surrounding said handle and slidable therealong, said upper membrane being centrally secured to the lower end of said sleeve, said lower membrane being centrally secured to the lower end of said handle, whereby movement of said sleeve relative to said handle is adapted to move said membranes together or apart from one another thereby contracting or expanding the affected perimeters thereof.

References Cited in the file of this patent

UNITED STATES PATENTS 2,416,623   Hampton _____ Feb. 25, 1947